Figure 1:
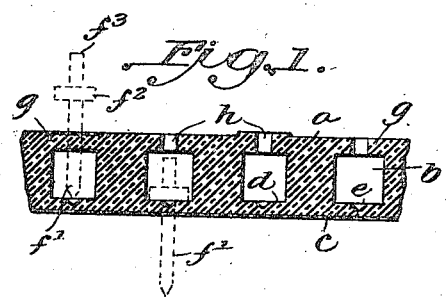

W. W. PHILLIPS.
INDIA RUBBER PAD FOR THE SOLES AND HEELS OF BOOTS AND SHOES.
APPLICATION FILED OCT. 16, 1915.

1,214,065.  Patented Jan. 30, 1917.

Inventor:
Walter W. Phillips
By Julian C. Dowell
his attorney

UNITED STATES PATENT OFFICE.

WALTER WILLIAM PHILLIPS, OF LONDON, ENGLAND.

INDIA-RUBBER PAD FOR THE SOLES AND HEELS OF BOOTS AND SHOES.

1,214,065.

Specification of Letters Patent.    Patented Jan. 30, 1917.

Application filed October 16, 1915. Serial No. 56,240.

*To all whom it may concern:*

Be it known that I, WALTER WILLIAM PHILLIPS, a subject of the King of Great Britain and Ireland, residing at London, England, have invented Improvements in or Relating to India-Rubber Pads for the Soles and Heels of Boots and Shoes, of which the following is a specification.

This invention has reference to that kind of india rubber pads for boots and shoes in which the pads are provided with a number of holes or recesses extending through the greater part of the thickness of the pad, such holes or recesses (hereinafter referred to as holes) being intended to receive the attaching means. Heretofore it has been proposed to attach such pads to a boot or shoe (hereinafter referred to as a boot) by means of metal washers and nails having small heads but such fastening means have proved to be unsatisfactory in practice for the following reasons, namely (*a*) that owing to the use of the metal washers, the actual point of contact between the nail head and washer is not sufficiently distant from the front or wearing surface of the pad, after allowing for the layer of india rubber that must necessarily be left below the metal washer and which must be of sufficient strength to prevent the pad tearing away from the washer and nail after attachment to a boot and when in actual use; and (*b*) that when the heads of the said nails become worn away, which occurs more or less rapidly owing to the point of contact between the nail and washer being not sufficiently distant from the wearing surface of the pad, as explained, the washers pull away from the nails and the pads become wholly or partially detached from the boot. Such rubber pads although applicable to the heels of boots, for which they have mainly been designed, notwithstanding the objections referred to, are quite unsuitable for application to the soles of boots owing to rubber pads for this purpose being necessarily made much thinner than is usually allowable for pads for heels of boots.

Now the present invention has for its objects to provide rubber pads of the kind first herein mentioned that shall be free from the objections mentioned, which shall be specially suitable for application to the soles of boots without the aid of metal washers such as referred to, and which shall be comparatively light and durable in use and comfortable to wear. For this purpose a rubber pad according to the present invention is formed with nail holes extending from the front surface thereof to within a short distance of its back surface the rubber at the bottom of each hole being left uncovered or unprotected by reinforcing material at the front side but reinforced at the back surface, and each hole being provided at or near its outer end with an inwardly projecting relatively thin collar or flange of rubber integral with that of the pad. Such pads are attached to a boot by nails each having a head comprising a collar portion of a size substantially equal in area to that of the inner end wall of the hole against which it is to directly bear and a central stem of less area extending from the outer side of the said nail collar and whereby the nail can be hammered into its final position without the aid of a separate punch.

Pads of the kind described can be made of various shapes according to the positions they are intended to occupy on the soles or heels of boots and of suitable thickness. A thickness of about three sixteenths of an inch is found suitable for sole pads, but they may be made thicker in some cases. Heel pads would usually be thicker. The back of each pad is reinforced, as by a layer of canvas or other suitable material, attached to or inserted into it by or in course of vulcanization, or by other suitable means, in order to give the pad the requisite strength and to reduce the elasticity of the back part of it, thereby rendering the pad more secure after attachment to the boot.

In order that the nature and mode of carrying out the invention may be clearly understood it will now be described with the aid of the accompanying illustrative drawings wherein—

Figure 2:
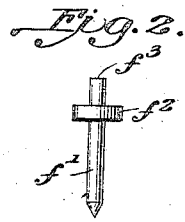
Figure 3:
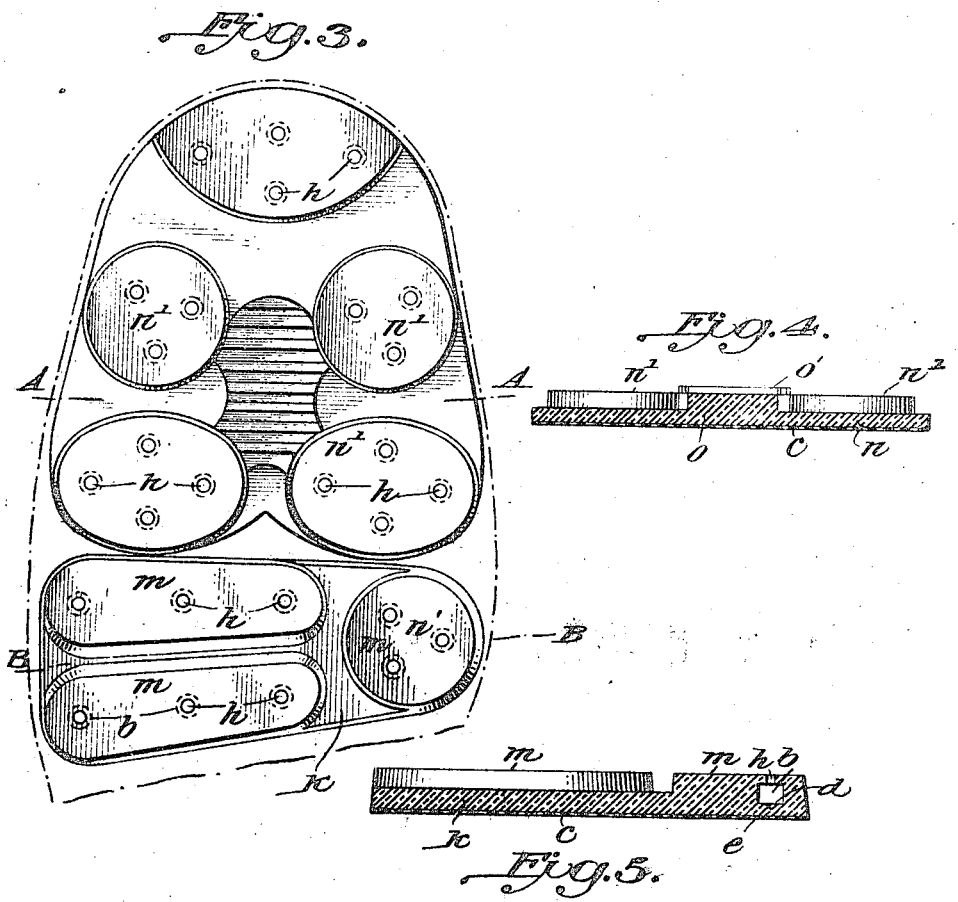
Figure 4:
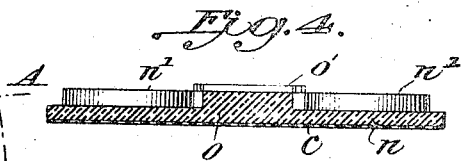
Figure 5:
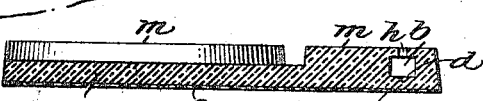

Figure 1 shows in vertical section and to an enlarged scale, part of a pad according to the invention. Fig. 2 shows also to an enlarged scale, one of the special nails according to the invention used for securing such a pad to a boot. Fig. 3 is a view of the underside of two forms of sole pads embodying the invention, shown applied to the sole of a boot indicated by dotted lines. Figs. 4 and 5 are sections taken on the lines A A and B B respectively of Fig. 3.

According to the present invention a pad *a* for a boot is, as shown in Fig. 1, provided with a number of holes or recesses *b* each preferably of about three sixteenths of an inch in diameter and extending to within about one sixteenth of an inch from the back surface of the pad which is reinforced by a layer $c$ of canvas or other suitable textile fabric. The inner end or floor $d$ of each hole or recess is preferably provided in the center with a small conical hole or recess $e$ for the purpose of receiving and guiding the point and stem of the attaching nail.

In order to facilitate the attachment of a pad of the kind described to a boot there are employed nails of the kind shown in Fig. 2 the heads of which are each formed by an annular enlargement, flange or collar $f^2$ (hereinafter called the collar) from which projects a short upper central stem or extension $f^3$ that may, as shown, be of the same diameter as the shank $f^1$ of the nail. The collar $f^2$ may conveniently be about $\frac{3}{16}$ of an inch in diameter and for a pad, such as a sole pad, of about $\frac{3}{16}$ of an inch in thickness, the thickness of the collar may be about $\frac{1}{32}$ of an inch and the height of the nail head comprising the collar $f^2$ and axial stem or extension $f^3$ may conveniently be about $\frac{1}{8}$ of an inch. For thicker pads, say of $\frac{5}{16}$ of an inch, the thickness of the collar may be $\frac{1}{16}$ of an inch and the height of the head about $\frac{3}{16}$ of an inch. Such nails are made as cut nails as distinguished from cast nails, such as ordinary hob nails, and are harder and therefore better adapted to withstand any tendency to bending when being hammered in place than cast nails. The stems $f^1$ of such cut nails are preferably corded or otherwise roughened during manufacture to assist in their being held firmly in place when in use.

In order that a pad having holes as described may be properly attached to a boot by nails such as referred to, it is necessary that the nails should be hammered down straight and truly in the holes in the pad and into the sole or heel of the boot. This is very important, but owing to the shortness of the nail that must necessarily be used when attaching a rubber pad to the sole of a boot it is practically impossible to hammer down the nail while holding it between finger and thumb in the usual manner, and, obviously, if the nail is not in an upright position before it is struck by the hammer, it is knocked sidewise and penetrates crookedly, or may even not penetrate at all. Therefore in order to enable the attaching nails to be easily and properly centered and held in position in the holes and then left without holding them by the fingers so that they can afterward be easily hammered down without the aid of a separate punch, in a true and straight direction and their heads caused to properly enter the holes $b$, which are or may advantageously be of cylindrical shape as shown, and become seated squarely and fairly on the floor $d$ thereof and in this way enable the pads to be easily, quickly and effectually secured in place, the outer end portion of each hole $b$ is provided, as shown in Figs. 1 and 3, with an inwardly extending and relatively thin flange or collar $g$ of rubber integral with the remainder of the rubber pad $a$. The opening $h$ through each flange or collar is of a diameter equal or approximately equal to that of the shank of the nail to be inserted in the hole, say about $\frac{1}{16}$ or $\frac{3}{32}$ of an inch, so that a nail inserted partly through the collar $g$ and into the recess $e$ in the floor or the hole will, as shown at the left hand side of Fig. 1, be held by the collar in an upright position and can be easily and fairly struck by a hammer and driven truly and straightly home through the rubber pad and into the sole or heel of a boot until the head of the nail rests fairly against the bottom or floor $d$ of the hole.

When a nail of the kind described is being hammered down, the rubber collar $g$ will usually spring up and resume its normal position during the short interval of time that elapses between the blows of the hammer, the large head of the nail being subsequently ensconced and partially hidden in the hole below the rubber collar, without any distortion of such collar. Should the blow of the hammer cause the head of the nail to pin down the rubber collar beneath it, the collar usually will gradually—in a few seconds or perhaps a minute—squeeze out and extricate itself and resume its normal position. It is mainly for this reason that the rubber forming the collar is preferably made about $\frac{1}{16}$ of an inch thick throughout or slightly less as this is found to be a sufficient thickness to possess the necessary squeezability. If the rubber collar be made with a chamfer there is a possibility, in such a case as last described, of its being permanently pinned down by the head of the nail, which would of course be objectionable. Nevertheless, a rubber collar $g$ as described but chamfered or otherwise shaped, may be used if desired. The outer surface of the collars may be flush with or slightly above the general surface of the rubber pads, as shown respectively at the center and right hand side respectively of Fig. 1, or some may be flush and others above the said surface of the pad as may be desired.

In order to attach a pad such as described to a boot, the latter is placed on an ordinary iron foot or last, then the pad is placed in the required position on the sole or heel of the boot and each nail placed in a hole $b$ and hammered down, which can be done without the use of a punch or other similar implement, until the upper end of the head of the nail is below the wearing surface of the pad and until the flat surface of the collar $f^2$ of the nail head bears tightly against and compresses the inner end wall $d$ of the hole $b$ (see Fig. 1.), thereby securing the pad to the boot in a firm and secure manner and without interfering with its resiliency.

The use of the new construction of nails (Fig. 1) facilitates the proper attachment of a rubber pad to a boot inasmuch as when such a nail is being hammered down in place in a hole, the rubber collar $g$ will more easily resume its normal position than when a nail having a stouter head is used, for the reason that when the collar $f^2$ of the nail head has passed the rubber collar $g$ at one part, such part will not be stretched so much as it would be when a nail similar to a hob nail is used and consequently its elasticity will be available to render it easier for another part of the rubber collar $g$ to pass in its turn over the collar $f^2$ of the nail head. The reduction in weight of the improved nails (Fig. 1), due to the shape of their heads, as compared with hob nails, is also important in view of the number of nails necessary for the secure attachment of the rubber pads to a boot.

The principal and essential improvement that results from the use of nails each having a head such as described is that in marked contradistinction to the use of the already known combination of small headed nails and metal washers for the purpose, the pad is held securely in position until the large heads of the nails are almost entirely worn away and as the actual place of contact between the nails and floors of the holes is situated at only about one sixteenth of an inch from the back surface of the pad, and is therefore relatively very distant from the wearing surface of the pad when the latter is new, there must necessarily be very considerable attrition by wear of both the pad and of the heads of the nails before any tearing away of the pad from the nails will occur. In fact the pad will have become practically worn out and non-effective before it will be torn from the nails. In effect, this result constitutes a very substantial improvement over the result obtained by the previously known means of attachment to boots of india rubber pads of the type referred to, and herein lies the main feature of the present invention.

The heads of the nails will not appreciably affect the resilient tread obtained by the use of pads such as described. When first put into use, the heads of the nails, are, usually sunk a short distance say about one-sixteenth of an inch or less into the surface of the pad, and it is found by actual trial that the wear of the pad is such, when a really good quality of rubber is used, that the heads of the nails continue to remain slightly within the wearing surface of the pad until the pad is nearly worn away. Consequently, the pad retains its resiliency, as well as remains securely attached to the boot, until it becomes practically worn out.

Rubber pads constructed with holes as described and secured to a boot by nails in the improved manner hereinbefore described, can be constructed in various forms. A very suitable arrangement of the improved pads for the sole of a boot comprises, as shown in Figs. 3, 4, and 5, two pieces, one (see Figs. 3 and 4) adapted to cover approximately the front half of the sole $i$ and the other (see Figs. 3 and 5) adapted to be applied behind the first piece across the sole at about its widest part as shown. The latter piece consisting of a base $k$ provided with raised studs $m$ of any suitable form, is the one that the wearer stands on, while the former piece mainly comes into use when the wearer is in motion, for instance when walking, running, or going upstairs, and constitutes what may be called the stepping-off piece. This stepping-off piece or pad is preferably formed of a sheet or base $n$ of rubber, which may conveniently be say about $\frac{1}{16}$ of an inch thick and be provided with a number of raised studs $n^1$ of circular, oval or other suitable shape. In the example shown, some of them are circular and some oval. A suitable thickness for such studs, including the sheet or base carrying them, is about $\frac{3}{16}$ of an inch, although they may be thicker if desired. Each of the studs $m$ and $n^1$ is provided with a number of nail holes $b$. The said stepping-off piece or pad, is also preferably provided with one or more studs or parts, one is shown at $o$, formed with transverse ridges $o^1$ extending above the main surface of the pad with a view to preventing any tendency of the wearer to slip on a moist or greasy pavement, which tendency usually occurs at the moment of stepping-off. Such ridges may be of rectangular shape in cross section, about $\frac{1}{32}$ to $\frac{1}{16}$ of an inch in height and about $\frac{1}{16}$ of an inch in width with about $\frac{1}{16}$ or $\frac{1}{8}$ of an inch between adjacent ridges, although any equivalent arrangement or dimensions of ridges or other suitable equivalent formations raised above the main surface of the studs or pad may be used.

Although the invention is specially applicable to sole pads, because these have usually to be made much thinner than heel pads need be made, it will be understood from the foregoing description that the invention is also applicable to heel pads.

What I claim is:—

1. For a boot the combination of a rubber pad having therein a number of nail holes each extending from the tread surface of the pad and provided at its outer end with a relatively thin collar of rubber and nails each having a head comprising a collar portion to bear against the inner end wall of the hole and a central stem of less area extending from the outer side of the nail collar so constructed and arranged that the nail can be hammered into its final position without the aid of a separate punch.

2. For a boot, the combination of a rubber pad having therein a number of cylindrical nail holes each extending from the tread surface of the pad to within a short distance of the back surface thereof and provided at its outer end with a relatively thin collar of rubber, and nails each having a head comprising a circular collar portion of a size substantially equal in area to that of the inner end wall of the hole against which it is to bear and a central stem of less area extending from the outer side of said nail collar so constructed and arranged that the nail can be hammered into its final position without the aid of a separate punch.

Signed at London, England, this first day of October, 1915.

WALTER WILLIAM PHILLIPS.

Witnesses:
A. J. DRYWOOD,
F. I. MASON.